United States Patent

Yamashifa

[15] 3,680,059

[45] July 25, 1972

[54] MEMORY DEVICE UTILIZING PULSE GENERATING DIODE

[72] Inventor: Sadahiko Yamashifa, Osaka, Japan

[73] Assignee: Matsushita electric Industrial Company, Limited, Osaka, Japan

[22] Filed: Sept. 16, 1970

[21] Appl. No.: 72,697

[30] Foreign Application Priority Data

Sept. 14, 1969 Japan..................................44/76057

[52] U.S. Cl..........................340/173 NR, 307/260, 307/317, 340/173 R, 331/107 R, 331/115

[51] Int. Cl.......................................G11c 11/36, H03b 7/06

[58] Field of Search ................340/173 R, 173 NR; 307/260, 307/317; 331/107 R, 107 T, 115

[56] References Cited

UNITED STATES PATENTS 3,339,185 8/1967 Miller..............................340/173

*Primary Examiner*—Terrell W. Fears
*Attorney*—John Lezdey

[57] ABSTRACT

A memory device comprising a circuit including in combination a gate diode and an oscillatory loop having a pulse generating diode. The oscillatory loop is adapted to produce a pulse train to be stored and to cease oscillate respectively in response to application thereto of a single and negative trigger pulse when the pulse generating diode is biased at a voltage between the oscillation starting and terminating voltages of the diode. With a reading-out pulse being applied to the loop, a single pulse or a pulse train is obtained from the stored pulse train. The pulse generating diode employed in the device is a novel having a $\nu$-N structure.

1 Claim, 8 Drawing Figures

INVENTOR

BY

ATTORNEY

INVENTOR
SADAHIKO YAMASHITA
BY John Lezdey
ATTORNEY

MEMORY DEVICE UTILIZING PULSE GENERATING DIODE

This invention relates to a memory device utilizing a pulse generating diode.

It is an object of this invention to provide an improved memory device.

Another object is to provide an improved memory device employing a pulse generating diode and a gate diode.

A further object is to provide a high-speed memory device having a relatively simple circuit.

Figure 4:
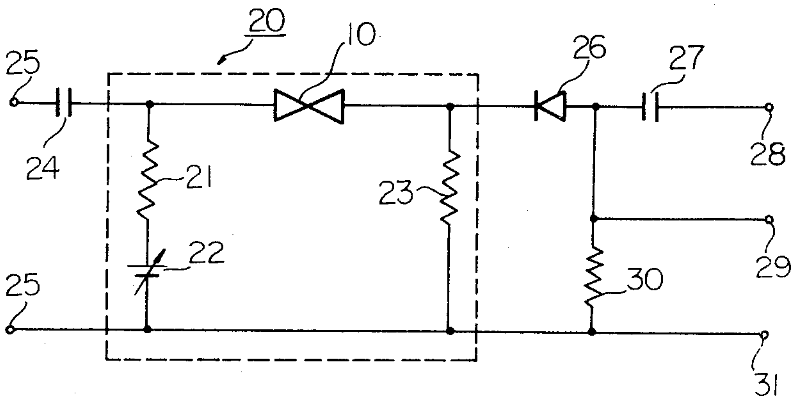
FIG. 4 is a circuit diagram of a memory device according to this invention.

FIGS. 5(a) to 5(d) are illustrative views explaining the principle of the memory device of FIG. 4.

Before describing more specifically the concept of this invention, it will be helpful to discuss the principle of the oscillation mechanism of the pulse generating diode.

Figure 1:
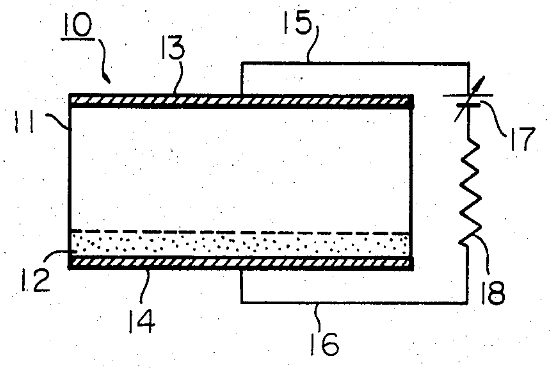
FIG. 1 is a schematic sectional view of a pulse generating diode employed in the present oscillator devices.

Referring to FIG. 1, the pulse generator 10 as applicable in this invention has a diode configuration and comprises a wafer 11 of a semiconductor material. The material of the wafer 11 may be gallium arsenide. The wafer 11 is, for example, of N-type and has a highly resistive layer 12 formed adjacent one of the two major surfaces thereof. Diffusion or crystal growth may be utilized to dope an impurity, locally lowering the conductivity of the wafer 11 to thereby form the highly resistive layer 12 of $\nu$ type. The diode has thus a $\nu$-N structure, and a similar characteristic is also available in the case of a symmetrical structure of $\nu$-N-$\nu$ type. The impurity may comprise, for example, iron, nickel, copper, chromium, cobalt or manganese.

Deposited upon and in ohmic contact with both of the major surfaces of the wafer 11 are conducting electrodes 13 and 14 which may comprise tin alloy, eutectic mixture of gold and germanium and the like. Connections to these electrodes 13 and 14 are made by lead wires 15 and 16, respectively, which are connected across a power source 17 of variable DC voltage in series with a load resistance 18.

Figure 2:
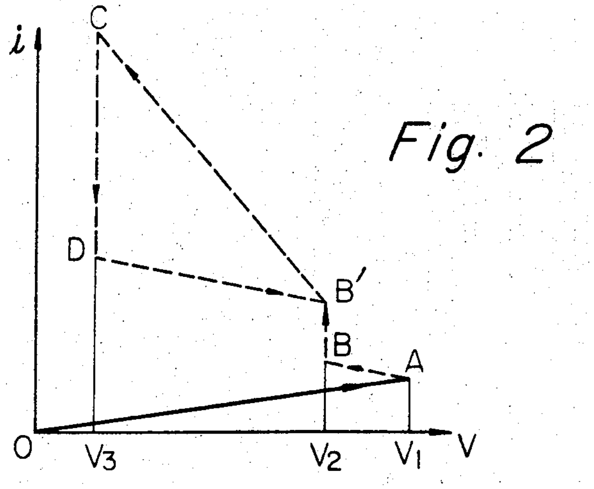
FIGS. 2 and 3 are illustrative graphs explaining the principle of the oscillation mechanism achievable with the pulse generating diode of FIG. 1.

Turning now to FIG. 2, as a voltage V as applied across the wafer 11 is increased, the current $i$ flowing therethrough slightly increases. When the voltage V exceeds the threshold value $V_1$, avalanche multiplication of carriers takes place in the highly resistive layer, causing the operating point to move from A to C through B and B'. The point C may be assumed to correspond to the conditions under which the highly resistive layer 12 is short-circuited. The operating point, then, moves to point D and back to point B'. It should be noted that this cycle repeats itself along the locus B'CD if the bias voltage V is above $V_2$. Therefore, the value $V_1$ may be called on oscillation starting voltage, while the value $V_2$ an oscillation terminating voltage.

As will be understood from the locus B'CD, this diode may switch between a high- and low-current situation due to the effect of the avalanche multiplication and to the trapping effect in deep impurity centers.

Figure 3:
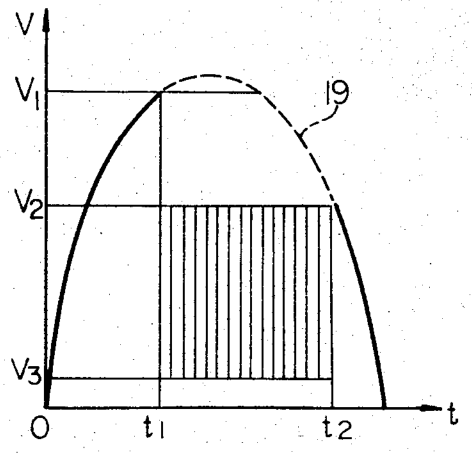

FIG. 3 is a plot of voltage V appearing across the diode 10 against time $t$, when the magnitude of the bias voltage $Vb$ is sinusoidally changed during a half cycle. As shown, the voltage V increases with increasing bias voltage $Vb$. At the time $t_1$ when $Vb$ reaches $V_1$, the diode 10 starts to oscillate, so that the voltage V cyclically varies between $V_2$ and $V_3$, as described in connection with FIG. 2.

However, as is shown by the dotted line 19 of FIG. 3, even if the bias voltage $Vb$ is decreased below $V_1$, the diode 10 does not cease to oscillate. For the diode 10 to cease oscillation, it is necessary to lower the bias voltage $Vb$ below $V_2$. It is to be understood, in this connection, that a hysterisis phenomenon can be observed in this pulse generating diode 10.

The diode may be characterized as follows. (1) The upper limit of the repetition rate is determined by the property of the diode itself, and the lower limit is reduced by increasing the RC time constant of the external circuit. (2) The pulse-repetition rate has been varied by a DC bias current of the order of ten. (3) A large output voltage of up to 50 volts (for a 50 ohm resistive load) is obtained with a pulse width of a few nanoseconds.

FIG. 4 is a diagram of a basic circuit used in the memory device according to this invention. The circuit is shown to include an oscillatory loop 20, as enclosed by a dotted rectangle, having connected in series with each other the pulse generating diode 10, a protective resistance 21, a power source 22 and a load impedance 23. The power course is of variable DC type applying a bias voltage $Vb_1$ to the diode 10. One terminal (not numbered) of the diode 10 is connected through a capacitor 24 to one of imput terminals 25, to which an input signal is applied to be stored. The circuit further includes a gate diode 26 through which the connection between the pulse generating diode 10 and the load impedance 23 is connected through a capacitor 31 to one reading-out terminal 30. The other reading-out terminal 29 is connected through another load impedance 30 to the oscillatory loop 20. The terminal 29 also acts as an output terminal together with still another terminals 27 and 29 being connected to the second-named load impedance 28.

Figures 5A, 5B, 5C, 5D:
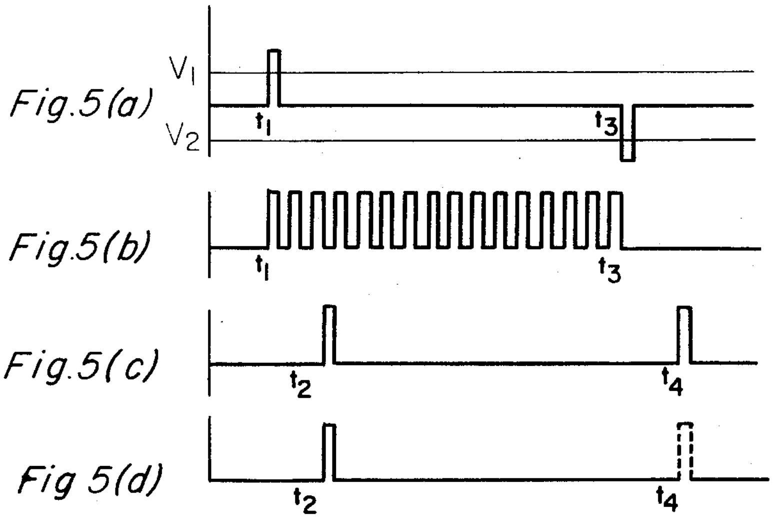

In the operation of the circuit shown in FIG. 4, the DC voltage source 22 is assumed to be adjusted so that $V_2 = Vb_1 = V_1$. When a single pulse having a sufficiently large amplitude, as shown in FIG. 5(a), is applied at the input terminals 25 at a time $t_1$, a superimposed voltage as applied across the diode 10 exceeds its threshold value $V_1$, causing the diode 10 to start oscillation, as shown in FIG. 5(b). Since the bias voltage is above $V_2$, in this instance, the oscillatory loop 20 continues oscillatory loop 20 continues oscillating to produce a pulse train, until a negative pulse is applied to the input terminals 25 at a time $t_3$. This means that an applied input signal is stored in the loop 20 from the time $t_1$ to the time $t_3$. Then, as shown in FIG. 5(c) a reading-out input signal is applied at a time $t_2$ to the terminals 28 and 29 in the forward direction of the gate diode 26. Since the time $t_2$ resides between the times $t_1$ and $t_3$, in this instance, the applied input pulse reads out one of the stored pulses to thereby produce a single pulse or a pulse train at the output terminals 29 and 31 as shown in FIG. 5(d). At the time $t_3$ a negative pulse is applied to the input terminals 25, which ceases the pulsating oscillation along the loop 20. The subsequent condition of having no stored pulse continues until another positive input pulse is applied to the input terminals 25. At a time $t_4$, therefore, there appears no output pulse at the terminals 29 and 31 even upon application of another reading-out pulse, as is apparent from a dotted pulse form in FIG. 5(d).

It should be appreciated here that a high-speed memory device can be obtained according to this invention without use of an existing complex circuit.

What is claimed is:

1. A memory device comprising:

an oscillatory loop including a pulse generating diode having an n-layer and a highly resistive $\nu$-layer doped with an impurity causing thereto reduction of conductivity, said diode generating pulses when the voltage applied thereto exceeds the oscillation starting voltage due to the avalanche multiplication and trapping of carriers in deep impurity centers and ceasing to generate pulses when the voltage applied thereto becomes below the oscillation terminating voltage, a load impedance connected in series with said diode, a DC power source connected in series with said diode and said load impedance for applying to said diode a bias voltage of the value less than said oscillation starting voltage and higher than said oscillation terminating voltage, and a protective resistance inserted between said diode and said DC power source;

input means for superimposing an input voltage on said bias voltage for causing or ceasing the oscillation of the diode;

a gate diode through which a reading-out pulse is applied to said oscillatory loop; and reading-out means including reading-out pulse generating means and an out-put means having a load impedance.

* * * * *